United States Patent [19]

Umezawa

[11] Patent Number: 5,025,270

[45] Date of Patent: Jun. 18, 1991

[54] RECORDING APPARATUS COUPLED INK SUPPLY TUBES

[75] Inventor: Kazuhisa Umezawa, Tokyo, Japan

[73] Assignee: Seiko Instruments, Inc., Chiba, Japan

[21] Appl. No.: 369,708

[22] Filed: Jun. 22, 1989

[30] Foreign Application Priority Data

Jun. 27, 1988 [JP] Japan ............................ 63-85404[U]
Jul. 1, 1988 [JP] Japan ............................ 63-88335[U]
Jul. 1, 1988 [JP] Japan ............................ 63-88336[U]

[51] Int. Cl.[5] ............................................ G01D 15/18
[52] U.S. Cl. .................................. 346/140 R; 346/75
[58] Field of Search .............................. 346/75, 140 R

[56] References Cited

U.S. PATENT DOCUMENTS 4,394,669 7/1983 Ozawa et al. .................. 346/140 R
4,684,962 8/1987 Hirosawa et al. .............. 346/140 R

*Primary Examiner*—Bruce A. Reynolds
*Assistant Examiner*—Gerald E. Preston
*Attorney, Agent, or Firm*—Spensley Horn Jubas & Lubitz

[57] ABSTRACT

An ink jet recording device composed of a plurality of ink jet heads reciprocally acting in a direction perpendicular to a paper sheet feeding direction, and a plurality of ink supplying tubes connected between the ink set heads and an ink supplying source to supply ink to the recording heads. The ink supplying tubes are bound together in a plane and arranged to be parallel to the movement direction of the ink jet heads so that the radius of curvature of the bending part of the ink supplying tubes can be diminished and sliding of the ink supplying tubes relative to each other is avoided.

9 Claims, 5 Drawing Sheets

RECORDING APPARATUS COUPLED INK SUPPLY TUBES

BACKGROUND OF THE INVENTION

This invention relates to an ink jet recording apparatus such as a printer or a plotter, and more particularly to an ink jet recording apparatus having a plurality of recording heads and a plurality of ink supplying tubes corresponding thereto.

Heretofore, in the ink supplying tubes of an ink jet recording device, as shown in FIG. 8, a plurality of tubes 5 containing ink 6 are inserted as a bundle into a guide tube 9.

However, since a plural number of ink supplying tubes are formed in a bundle, the radius of bending of the ink supplying tubes must be large, and this causes a problem in the case of miniaturizing the apparatus. Further, since the tubes are inserted in an ink supplying tube guide tube, there was a problem that the ink supplying tubes are worn due to the sliding of the ink supplying tubes against each other in the guide tube and the sliding of the guide tube in the case of reciprocal movement of the recording head, resulting in the occurrence of poor performance.

SUMMARY OF THE INVENTION

It is therefore an object of the invention to provide a compact and highly reliable ink jet recording apparatus.

It is another object of the invention to provide an ink jet recording apparatus in which the radius of the bending part of the ink supplying tubes can be diminished.

It is a further an object of the invention to provide an ink jet recording apparatus in which sliding of the ink supplying tubes relative to each other does not occur.

These and other objects of the invention are accomplished by an ink jet recording apparatus comprising a recording head block having a plurality of ink jet heads for spraying ink drops, head moving means for moving said recording head block reciprocally, paper feeding means for feeding a paper sheet in a direction perpendicular to the moving direction of the head, an ink supplying source for storing an ink, and a plurality of ink supplying tubes connected between said recording heads and said ink supplying source respectively and bound together in a plane and arranged to be parallel to the movement direction of said recording head for supplying said ink to said recording heads.

The plurality of ink supplying tubes may be glued together side by side in a plane.

The plurality of ink supplying tubes may be heat fusion welded together side by side in a plane.

The plurality of ink supplying tubes may be glued or heat fusion welded on a guide film in parallel with one another.

The plurality of ink supplying tubes may be held on a guide film with a clasp provided on said guide film in parallel with one another.

The plurality of ink supplying tubes may be molded with a resin in a plane.

DESCRIPTION OF THE PREFERRED EMBODIMENTS

Figure 1:
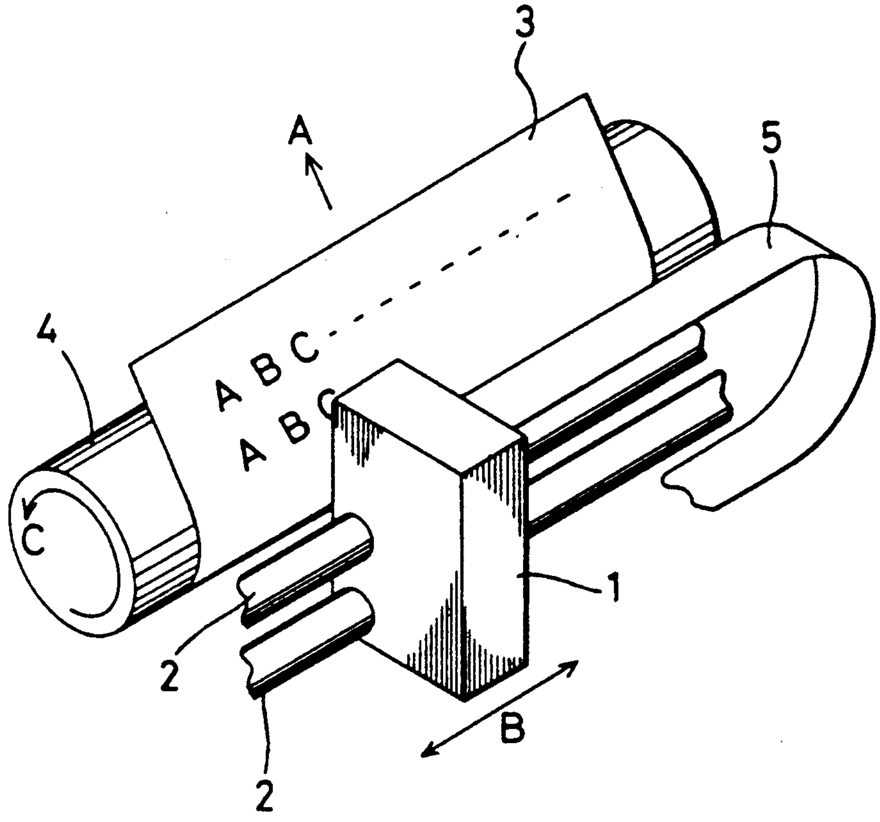
FIG. 1 is a perspective diagram of the essential parts of an ink jet recording apparatus according to the invention.

In FIG. 1, a recording head block 1 including a plurality of recording heads reciprocally moves in a direction (B direction) perpendicular to the feeding direction A of a paper sheet 3 along guide shafts 2 by a driving means (not shown). The heads spray ink drops at arbitrary times under control of a print recording signal from a print recording command means to effect recording.

The guide shafts 2 penetrate the recording head block 1 and is supported by the frame of the main printer body (not shown).

A platen 4 is supported to be free to rotate in direction C on the frame of the main printer body (not shown), and is rotated in direction C by a driving means (not shown).

Figure 2:
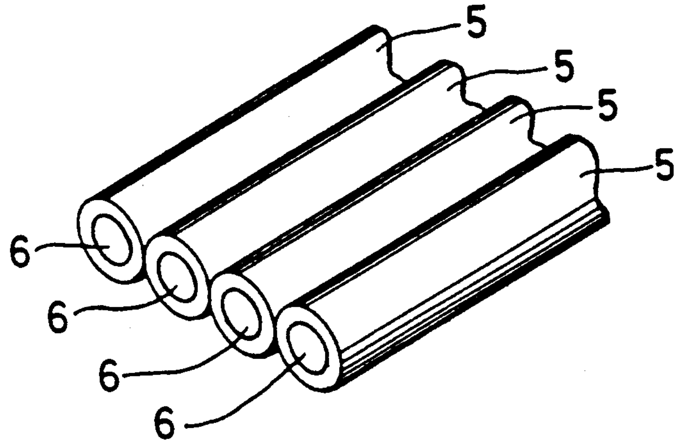
FIG. 2 is a sectional perspective diagram of ink supplying tubes according to one embodiment of the invention.

The ink supplying tubes 5 are heat fusion welded or glued together side by side, as shown in FIG. 2, in such a manner that a plurality of them are located in a single plane and, as shown in FIG. 1, are arranged to be parallel to the movement direction B of the recording head block 1 and to be free to move, to supply ink 6 from an ink supplying source (not shown) to the recording heads of the head block 1. The ink supplying tubes 5 move to follow the reciprocal movement of the recording head block 1, and the bending part of tubes 5 change arbitrarily.

Here, since respective ink supplying tubes 5 are mutually connected by heat fusion welding or gluing, the bending part of the ink supplying tubes 5 bends smoothly in the manner of a strip of tape and the radius of the bending portion can be small. Further, there occurs no sliding of the ink supplying tubes 5 relative to each other.

Figure 3:
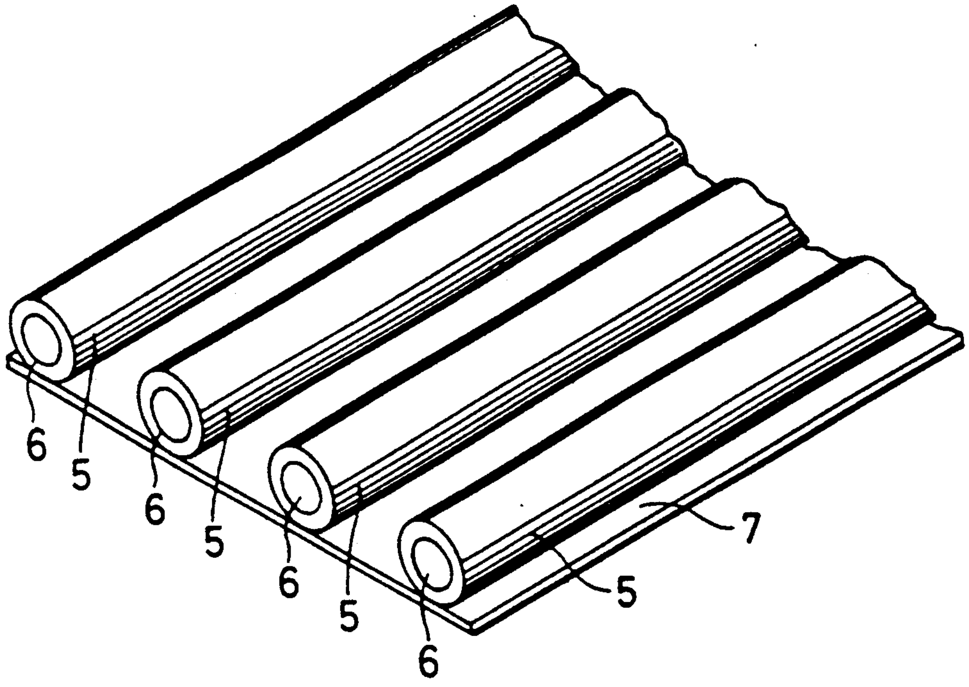
FIG. 3 is a sectional perspective diagram of ink supplying tubes according to another embodiment of the invention.
Figure 4:
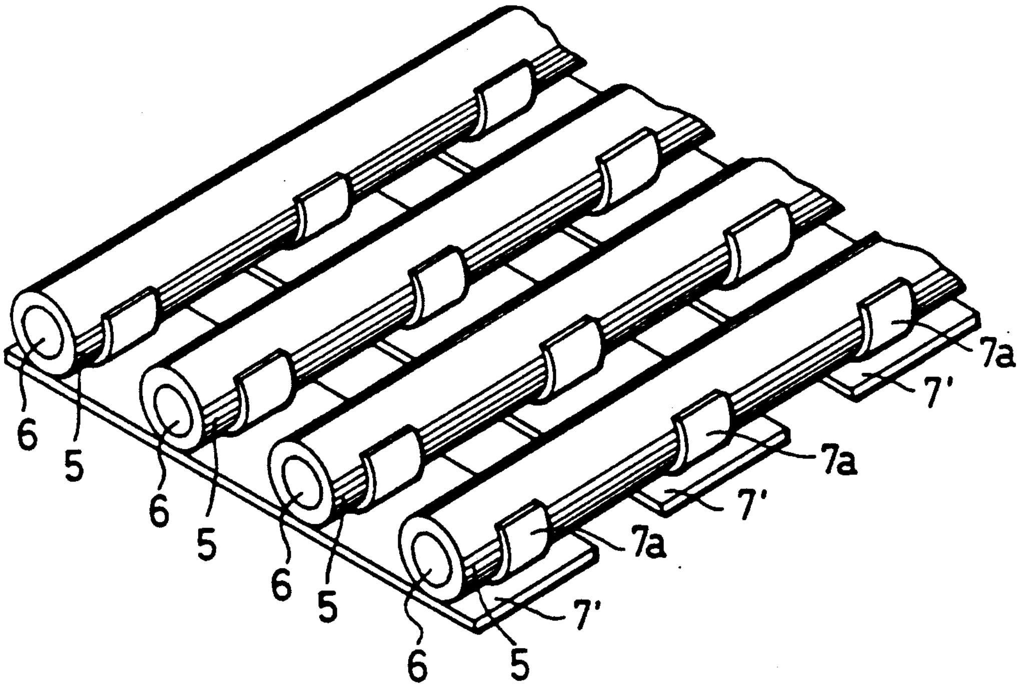
FIG. 4 is a sectional perspective diagram of ink supplying tubes according to another embodiment of the invention.

FIGS. 3 and 4 show other embodiments of the invention using a guide film or films. In FIG. 3, the ink supplying tubes 5 are head fusion welded or glued to a single guide film 7 in parallel with, but separated from, one another instead of being welded or glued directly together, to accomplish the same effect.

In FIG. 4, the ink supplying tubes are held on a plurality of guide films 7' by clasps, or retainers, 7*a* provided on the guide films 7' to exhibit further large effect for permitting further reductions in the radius of curvature of the bending part. Here, films 7' have no limiting effect on the bending part.

Figure 5:
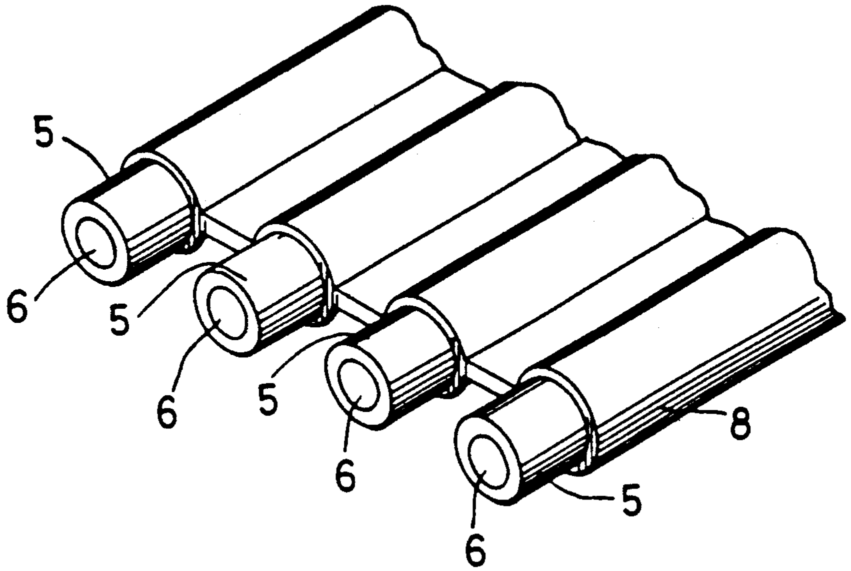
FIG. 5 is a sectional perspective diagram of ink supplying tubes according to another embodiment of the invention.
Figure 6:
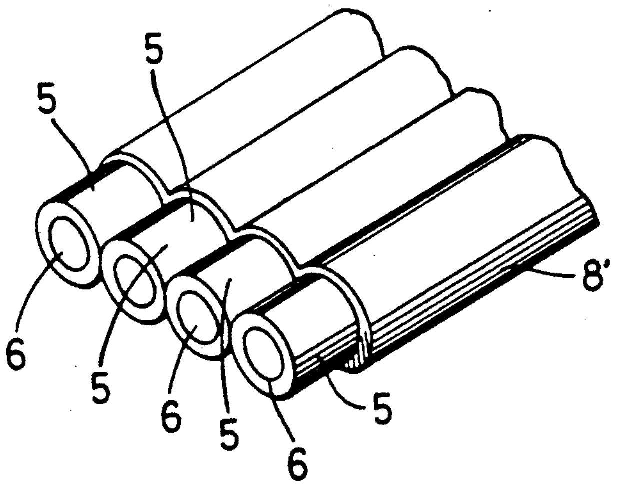
FIG. 6 is a sectional perspective diagram of ink supplying tubes according to another embodiment of the invention.
Figure 7:
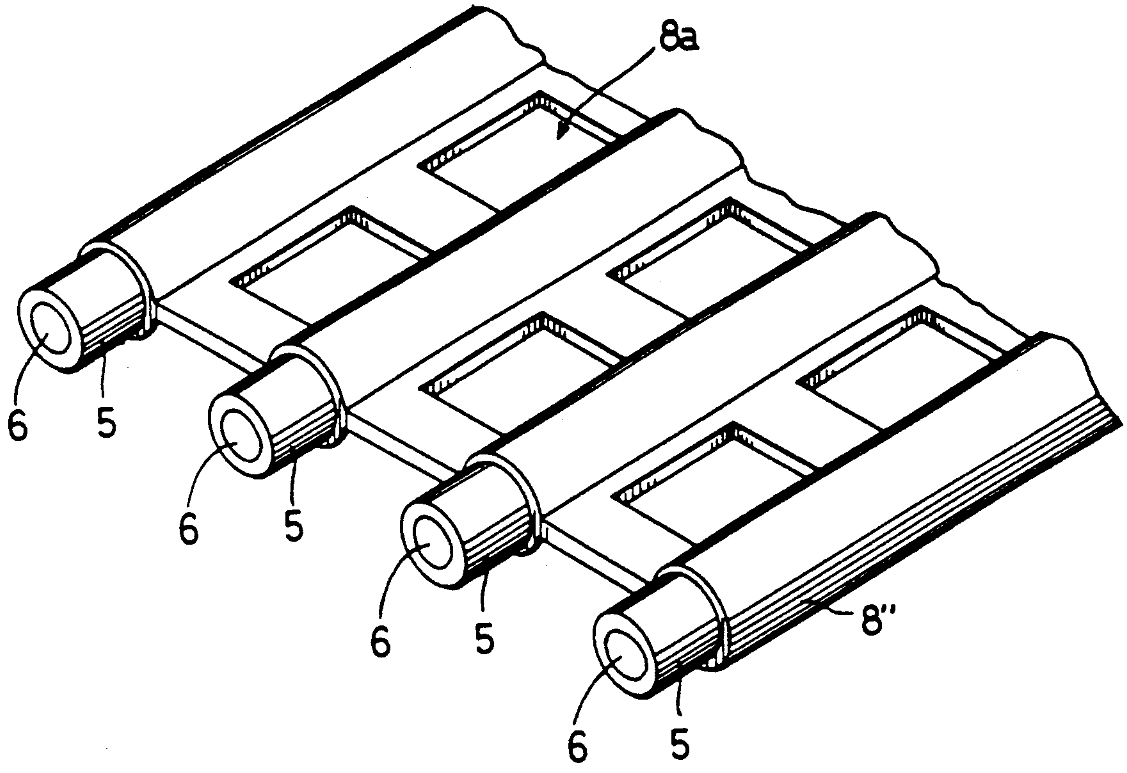
FIG. 7 is a sectional perspective diagram of ink supplying tubes according to another embodiment of the invention.
Figure 8:
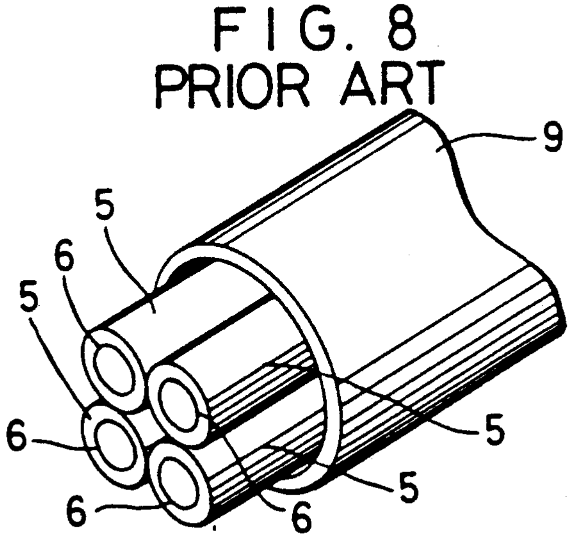
FIG. 8 PRIOR ART
FIG. 8 is a sectional perspective diagram of a conventional ink supplying tube.

FIGS. 5, 6 and 7 show further embodiments of the invention using molding or covering. In FIG. 5, the ink supplying tubes 5 are molded in such a manner that a plurality of them are connected in a plane by a cover 8 of a resin or the like.

In FIG. 6, the ink supplying tubes 5 are molded with a cover 8' to be in contact with one another.

In FIG. 7, the ink supplying tubes 5 are separatively molded to each other by a cover 8", and holes 8a are provided in cover 8" between the ink supplying tubes 5, to reduce the resistance to bending for allowing the radius of curvature of the bending part to be reduced.

As is clearly known from the above description, the ink supplying tubes of the ink jet recording printer or plotter are produced in such a manner that a plurality of ink supplying tubes are bound together in a single plane and are arranged in parallel to the moving direction of the recording head and to the bending direction of the tubes and to be free to bend, so that the radius of the bending part of the ink supplying tubes can be diminished, and further, since sliding of the ink supplying tubes to each other does not occur, a compact and highly reliable ink jet recording printer or plotter can be produced.

What is claimed is:

1. An ink jet recording apparatus comprising:

a recording head block having a plurality of ink jet heads for spraying ink drops;

head moving means for moving said recording head block reciprocally;

paper feeding means for feeding paper sheet in a direction perpendicular to the moving direction of said head block;

an ink supplying source for storing an ink, said source being stationary relative to said recording head block; and a plurality of flexible ink supplying tubes connected between said ink jet heads and said ink supplying source for causing said ink to flow in parallel through said ink supplying tubes in a given direction from said ink supplying source to said ink jet heads, said tubes being bound together in a plane and arranged to be parallel to the movement direction of said recording head block.

2. An ink jet recording apparatus as claimed in claim 1 wherein said plurality of ink supplying tubes are glued together side by side in the plane.

3. An ink jet recording apparatus as claimed in claim 1 wherein said plurality of ink supplying tubes are heat fusion welded together side by side in the plane.

4. An ink jet recording apparatus as claimed in claim 1 further comprising a guide film to which said plurality of ink supplying tubes are secured in parallel with one another.

5. An ink jet recording apparatus as claimed in claim 4 wherein said plurality of ink supplying tubes are glued to said film.

6. An ink jet recording apparatus as claimed in claim 4 wherein said plurality of ink supplying tubes are heat fusion welded to said film.

7. An ink jet recording apparatus as claimed in claim 4 further comprising clasps holding said ink supply tubes on said film.

8. An ink jet recording apparatus as claimed in claim 1 further comprising a plurality of guide films spaced apart along the length of said ink supplying tubes, with all of said ink supplying tubes being secured in parallel with one another to each said guide film.

9. An ink jet recording apparatus as claimed in claim 1 further comprising a molded resin body securing said ink supplying tubes together in the plane.

* * * * *